(No Model.) 2 Sheets—Sheet 1.
A. & R. COWAN.
GRAIN UNLOADING APPARATUS.
No. 535,979. Patented Mar. 19, 1895.
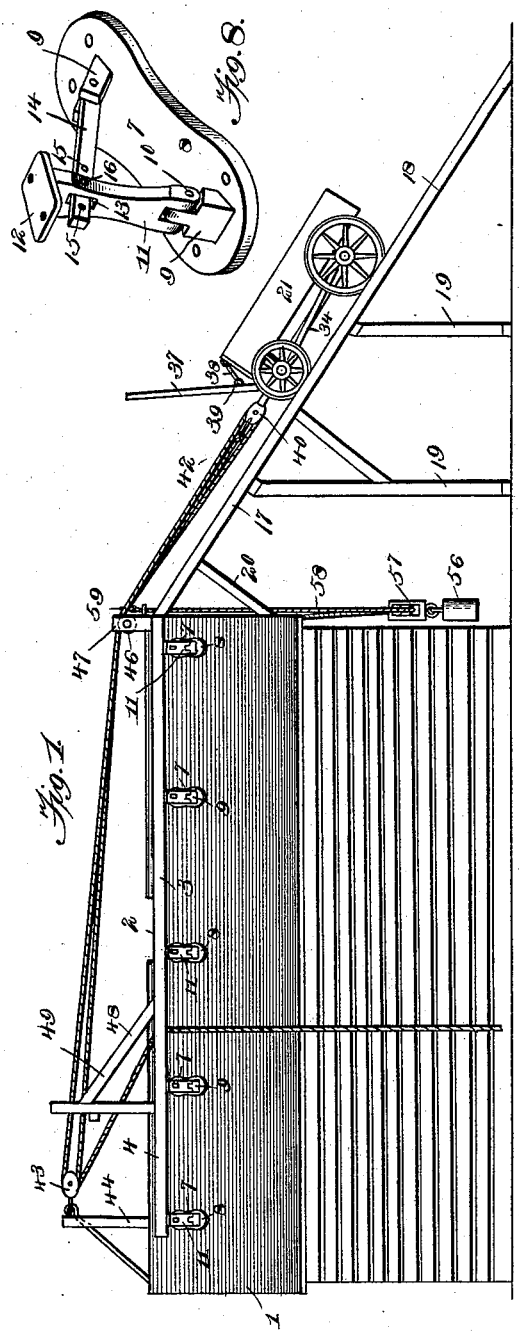
Witnesses
John C. Shaw
Inventors
Alexander Cowan
Robert Cowan,
By their Attorneys.
C. A. Snow & Co.

(No Model.) 2 Sheets—Sheet 2.
A. & R. COWAN.
GRAIN UNLOADING APPARATUS.
No. 535,979. Patented Mar. 19, 1895.
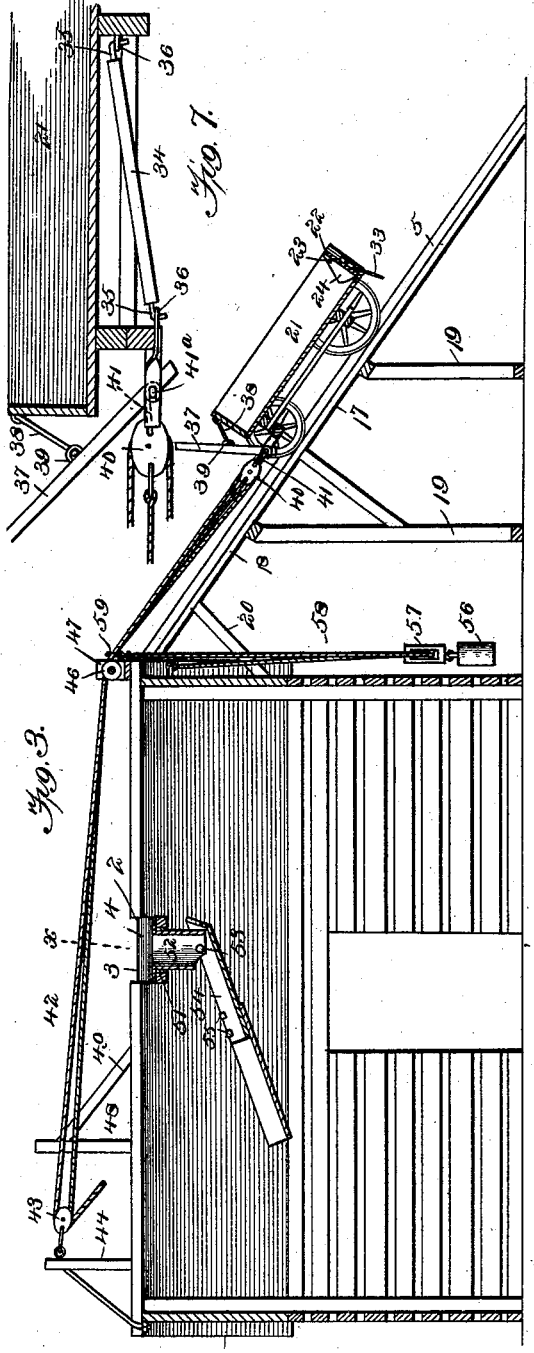
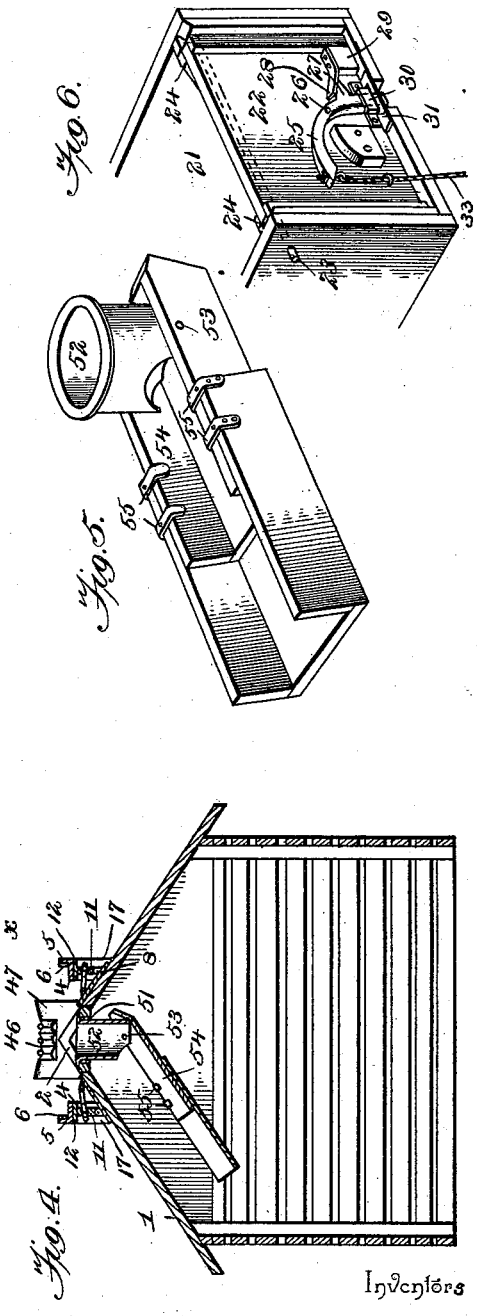
Witnesses
Inventors
Alexander Cowan
Robert Cowan,
By their Attorneys.

UNITED STATES PATENT OFFICE.

ALEXANDER COWAN AND ROBERT COWAN, OF PRIMGHAR, IOWA.

GRAIN-UNLOADING APPARATUS.

SPECIFICATION forming part of Letters Patent No. 535,979, dated March 19, 1895.

Application filed June 22, 1894. Serial No. 515,407. (No model.)

*To all whom it may concern:*

Be it known that we, ALEXANDER COWAN and ROBERT COWAN, citizens of the United States, residing at Primghar, in the county of O'Brien and State of Iowa, have invented a new and useful Grain-Unloading Apparatus, of which the following is a specification.

This invention relates to grain unloading apparatus; and it has for its object to provide a new and useful apparatus of this character forming an attachment to a crib or granary to provide simple and efficient means for unloading ear corn or other grain from the wagon into the top of the crib or granary and distributing the grain from the point of dump to any desired point inside of the crib or granary.

To this end the main and primary object of the present invention is to construct a grain unloading apparatus providing means for elevating a load of grain to the roof of the granary and distributing the same to any part thereof.

With these and other objects in view which will readily appear as the nature of the invention is better understood, the same consists in the novel construction, combination and arrangement of parts hereinafter more fully described, illustrated and claimed.

In the accompanying drawings, Figure 1 is a side elevation of a grain unloading apparatus constructed in accordance with this invention, as set up for use. Fig. 2 is a top plan view thereof. Fig. 3 is a central vertical longitudinal sectional view of the apparatus. Fig. 4 is a transverse sectional view on the line x—x of Fig. 3, including the adjustable rail brackets. Fig. 5 is a detail in perspective of the adjustable delivery spout. Fig. 6 is a similar view at one end of the wagon showing the end gate trip lock. Fig. 7 is a detail sectional view of the wagon body. Fig. 8 is a detail in perspective of one of the rail brackets. Fig. 9 is a detail sectional view showing the attachment of the inclined track frame.

Referring to the accompanying drawings, 1 designates the roof of an ordinary crib or granary that is pierced at any convenient point therein with the top grain receiving opening 2, and the roof 1, is adapted to support thereon the horizontal roof track 3. The horizontal roof track 3, consists of the opposite parallel track rails 4, provided with the side retaining flanges 5 to hold the wagon on the track and which are faced on their inner sides by the metallic wear plates 6, which relieve the side flanges 5, from frictional wear. The parallel track rails 4, of the roof track 3, are sustained in their horizontal positions on the roof of the granary by means of a series of adjustable rail brackets 7.

As illustrated in the drawings the rail brackets 7 are secured on top of the roof 1 at both sides of the peak thereof so that the grain receiving opening 2, in the roof will be disposed directly between the track rails 4, but it will of course be understood that the said rail brackets may be secured at any point on the roof according to the location of the opening 2.

The rail brackets 7 essentially comprise the attachment plates 8, that are adapted to be temporarily fastened to the roof and are provided on their upper sides at opposite points with the pivot lugs 9, to one of which is pivotally connected at 10, the lower ends of the adjustable upright supporting posts 11, to the upper end of which is fitted the flat rest plate 12, on which is secured the track rails 4. The adjustable upright supporting posts 11, of the adjustable rail brackets are provided near their upper ends with the slots or openings 13, that adjustably receive one end of the brace arms 14, the other ends of which are pivotally connected to the pivot lugs opposite those to which the posts 11 are connected, and said brace arms 14, are provided therein with a series of adjustment perforations 15, which receive the pins 16, passed therethrough and also through the slots or openings 13, receiving one end of the said brace arms. This construction of track bracket provides means whereby the same can be attached to a roof with any pitch and at the same time dispose the supporting posts 11 thereof in an upright or vertical position in order to sustain the track rails of the roof track in a horizontal position.

The horizontal roof track extends at one end beyond the grain opening 2, in the roof and at its opposite end extends out to one end of the roof of the granary, and at this point the rails 4 of the roof track are met by the upper ends of the inclined ground track 17. The inclined ground track 17, extends from the ground up to one end of the track 3, and consists of opposite parallel track rails 18, constructed in the same manner as the rails 4, of the roof track, and said inclined ground track 17, is supported above the ground on the upper ends of different sized track supporting frames or stands 19 and is securely braced at its upper end to one end of the granary roof by the braces 20. The tracks 17 and 3 are designed to accommodate for travel thereon an ordinary grain wagon 21, that is adapted to be filled with ear corn or other grain that is to be carried up to the roof of the granary and unloaded or dumped into the top grain opening 2, thereof. The wagon 21, is of an ordinary construction, but in the present invention it is preferably equipped at the rear dumping end thereof with the swinging end gate 22. The end gate 22, is pivoted at its upper end between the opposite sides of the wagon body on the transverse pivot rod 23, and attached to opposite inner ends of said swinging end gate are the segmental end boards 24, that serve to inclose in the opposite sides of the end gate when open, and which permit the same to close freely.

The swinging end gate 22, at one end of the body of the wagon 21, has arranged on the outer side thereof the segmental lock lever 25. The segmental lock lever 25, is pivoted at an intermediate point at 26 to the end gate and is provided below its point of pivot with the shoulder offset 27, on which bears the free end of a leaf spring 28, secured fast at its other end as at 29, to the end gate. The lower extremity of said lock lever 25, is arranged to work in the off standing bracket 30, secured to the lower swinging edge of the end gate, and the said lower extremity of the lever 25 is held normally projected, by the spring, below the bracket so as to engage in the slot of the slotted keeper plate 31, secured to the bottom rear end of the body of the wagon. The upper end of the lever 25, has attached thereto one end of the trip cord 33, which may lead to the ground and provide means for releasing the lever 25, from its keeper, from the ground, when the wagon has been elevated to the point of dump on the roof of the granary.

In elevating the wagon 21, from the ground up the track 17, the front axle thereof is securely locked to the rear axle and prevented from turning sidewise on its king bolt as a pivot by means of the gear lock bar 34. The gear lock bar 34, is provided at both ends thereof with the engaging hooks 35, that are adapted to detachably engage the eye bolts 36, secured opposite to each other respectively to the front and rear axles of the wagon. During its elevation, the tongue 37, of the wagon is also supported and secured out of the way by means of the tongue supporting hook 38, pivotally connected at one end to the front end of the wagon body and detachably engaging an eye 39, at its other end, on the tongue 37.

To provide for elevating the loaded wagon 21, a pulley block 40, is detachably connected with one end thereof. The pulley block 40, is provided at one end with the connecting hooks 41, that are adapted to be detachably engaged over the draw bolt 41ª, that secures the hounds of the wagon to the tongue, and said pulley block 40, has attached thereto one end of the elevating rope 42. From its connection at one end to the pulley block 40, the elevating rope 42, passes up over the roof of the granary and around one of the pulleys in the double pulley block 43, that is loosely connected to the upper end of the anchor post 44, securely braced on top of the roof of the granary beyond the grain opening therein. The elevating rope 42 passes from one of the pulleys in the double pulley block 43, back to the pulley block 40 connected to the wagon and through the pulley therein, and from thence the rope is returned and passed around the other pulley in the pulley block 43. The free end of the elevating rope is passed from the pulley block 43, around the guide pulley 45 secured on the roof of the granary and from thence passes to the ground where a team or other suitable power may be connected thereto for the purpose of elevating the wagon up onto the roof. The several portions of the elevating rope 42, are held off from the end corner of the roof over which they pass by a series of anti-friction wheels or rollers 46, journaled in a block or support 47, secured on the roof between the meeting points of the rails 4 and 18.

By the connections described, the loaded wagon may be elevated on the track 17, and drawn over the roof track 3, up to the grain opening 2, formed in the roof of the granary, and at this point the front wheels of the wagon are elevated on the inclined track frame 48. The inclined track frame 48, is provided with the inclined elevating rails 49 leading up from the rails 4, of the roof track, and at opposite lower sides the said inclined track frame is provided with the attaching plates 50, that are adapted to be detachably secured to any point on the rails 4, to a proper position at one side of the grain opening 2, in the roof top 1. When the wagon is carried up onto the inclined track frame 48, the end gate thereof is unlocked and the contents of the wagon allowed to dump into the grain opening 2.

In the present invention the grain opening 2, has fitted thereinto a circular metallic bearing ring 51, in which turns the revoluble spout neck 52, to the lower inner end of which is pivotally connected, as at 53, one end of the extensible delivery spout or trough 54. The extensible delivery spout or trough 54, consists of duplicate spout sections fitting one within the other and adjustably connected together by U-shaped clips 55, secured to the opposite sides of the outermost spout section and embracing the upper side edges of the innermost spout section. By reason of the longitudinal adjustment of the spout sections and the revoluble support of the neck 52, it will be obvious that the grain dumped into the spout from the wagon may be distributed to any part of the granary. After dumping the empty wagon is automatically returned to the upper end of the inclined ground track 17, by means of the returning weight 56. The returning weight 56, has connected thereto a pulley block 57, around which passes the weight rope 58, one end of which is secured fast at one end of the roof and the other end of which is provided with a ring 59, through which passes one of the portions of the elevating rope 42, so that the loaded wagon in being elevated to the point of dump will carry such ring end of the weight rope therewith so as to elevate the weight and bring the same to a position so that in falling, when the elevating rope is slacked up, it will return the wagon back to the upper end of the inclined ground track.

Changes in the form, proportion and the minor details of construction may be resorted to without departing from the principle or sacrificing any of the advantages of this invention.

Having thus described the invention, what is claimed, and desired to be secured by Letters Patent, is—

1. In an unloading apparatus, the combination of a granary having an opening in its roof, a track on the roof of said granary over the opening therein, an inclined ground track leading up to one end of the roof track, and hoisting devices for a wagon, substantially as set forth.

2. In an unloading apparatus, the combination of a granary having an opening in its roof, a track on the roof of said granary, an inclined ground track supported at one end on the ground and leading up to one end of the roof track, said tracks consisting of opposite parallel track rails provided with side retaining flanges and metallic wear plates facing the inner sides of said flanges, and the hoisting devices for the wagon, substantially as set forth.

3. In a grain unloading apparatus, the combination of a granary having an opening in its roof, a track on the roof of said granary, a series of adjustable rail brackets secured to the granary roof and adapted to support the rails of the roof track, the inclined ground track, and the elevating or hoisting devices for the wagon, substantially as set forth.

4. In a grain unloading apparatus, the combination of a granary having an opening in its roof, a parallel series of rail brackets secured on the roof of said granary and comprising attachment plates, adjustable upright supporting posts pivotally connected at their lower ends to said attachment plates, and brace arms pivotally connected at one end to said attachment plates and adjustably at their other ends to said supporting posts to secure the same in an upright position, the roof track having its rails secured to the upper ends of said supporting posts of said rail brackets, inclined ground track, and the elevating or hoisting devices for the wagon, substantially as set forth.

5. In a grain unloading apparatus, the combination of a granary having an opening in its roof, a track on the roof of said granary over the opening therein, an inclined ground track leading up to one end of the roof track, an inclined track frame detachably secured to the roof track at one side of the opening in said roof, the wagon, and the elevating or hoisting devices adapted to be connected with the wagon, substantially as set forth.

6. In a grain unloading apparatus, the combination of a granary having an opening in its roof, a track on the roof of said granary over the opening therein, an inclined ground track leading up to one end of the roof track, an inclined track frame detachably secured to the roof track at one side of the opening in the roof, the wagon having a swinging end gate, a trip lock for said end gate, and the elevating devices adapted to be detachably connected with the wagon, substantially as set forth.

7. In an apparatus of the class described, the combination with the track; of the wagon having a swinging end gate pivoted at its upper end within the rear end of the wagon body, a slotted keeper plate secured to the bottom rear end of the wagon body, a segmental lock lever pivoted at an intermediate point to the end gate and provided below its point of pivot with a shoulder off-set, a spring arranged to bear on said shoulder off-set to normally engage the lower end of said lever with said keeper plate, and a trip cord connected to the upper end of said segmental lock lever, substantially as set forth.

8. In a grain unloading apparatus, the combination with the tracks and the elevating devices; of the wagon having opposed eye bolts on the front and rear axles thereof, and a gear lock bar provided at both ends with engaging hooks adapted to engage said eye bolts, substantially as set forth.

9. In a grain unloading apparatus, the combination of a granary having an opening in its roof, a track on the roof of said granary over the opening therein, an inclined ground track, an inclined track frame secured to the roof track at one side of the opening in the roof, an anchor post secured on the roof at one end of the roof track, a double pulley block connected to said anchor post, the wagon, a pulley block provided with connecting hooks adapted to detachably engage the draw bolt of the wagon tongue, the elevating rope reeved around the pulleys in said pulley blocks and having one end attached to the pulley block connected to the wagon and the other end guided to the ground, and a weight connection with said elevating rope to return the empty wagon, substantially as set forth.

10. In a grain unloading apparatus, the combination of a roof track, an inclined ground track, the inclined track frame detachably secured to the roof track, the wagon, suitably arranged pulley blocks one of which is detachably connected to the front end of the wagon, the elevating rope reeved around the pulleys in said pulley blocks, a series of antifriction wheels or rollers arranged at the juncture between the roof and ground tracks and adapted to receive thereon the several portions of the elevating rope, a weight rope secured fast at one end to a suitable point of attachment and provided at its other end with a ring receiving one of the portions of the elevating rope, and a weight having a pulley block receiving around the pulley therein said weight rope, substantially as set forth.

11. In a grain unloading apparatus, the combination of a granary having an opening in its roof, a track on the roof of said granary over the opening therein, the ground track, the wagon, the elevating devices, and a grain delivery spout adapted to be adjustably arranged in said roof opening, substantially as set forth.

12. In a grain elevating apparatus, the combination of a granary having an opening in its roof, the track on the roof of said granary over the opening therein, the dump wagon, the elevating devices, and an extensible grain delivering spout adapted to be revolubly supported in said roof opening, substantially as set forth.

13. In a grain unloading apparatus, the combination of a granary having an opening in its roof, the track on the roof of said granary over the opening therein, the dump wagon, the elevating devices, a metallic bearing ring adapted to be fitted in said roof opening, a spout neck revolubly mounted in said bearing ring, and an extensible delivery spout or trough pivotally connected at one end to the lower end of said spout neck and consisting of duplicate spout sections adjustably connected with each other, substantially as set forth.

In testimony that we claim the foregoing as our own we have hereto affixed our signatures in the presence of two witnesses.

ALEXANDER COWAN.
ROBERT COWAN.

Witnesses:
J. L. E. PECK,
DAVID ALGYER.